United States Patent [19]

Vaughan

[11] Patent Number: 5,141,610
[45] Date of Patent: Aug. 25, 1992

[54] ELECTRODIALYTIC PROCESS FOR RESTORING SODIUM HYDROXIDE ETCHANTS FOR ALUMINUM

[76] Inventor: Daniel J. Vaughan, 36 Paxon Dr., Wilmington, Del. 19803

[21] Appl. No.: 522,083

[22] Filed: May 11, 1990

Related U.S. Application Data

[63] Continuation of Ser. No. 183,040, Apr. 19, 1988, abandoned.

[51] Int. Cl.⁵ .................. B01D 61/44; C02F 1/469; C25B 7/00
[52] U.S. Cl. .................. 204/182.4; 204/151; 204/153; 204/301
[58] Field of Search ............ 204/182.4, 182.3, 182.5, 204/DIG. 13, 96, 98, 153, 151, 149; 156/642

[56] References Cited

U.S. PATENT DOCUMENTS

| | | | |
|---|---|---|---|
| 1,572,115 | 2/1926 | Greenawalt | 204/116 |
| 2,723,229 | 11/1955 | Bodamer | 204/98 |
| 3,477,928 | 11/1969 | Coltrinari | 204/117 |
| 4,107,007 | 8/1978 | Gaumann | 204/116 |
| 4,111,772 | 9/1978 | Horn | 204/182.4 |
| 4,203,822 | 5/1980 | Sckenker et al. | 204/182.4 X |
| 4,488,950 | 12/1984 | Pooley et al. | 204/116 |
| 4,519,881 | 5/1985 | Chang | 204/182.4 X |
| 4,636,288 | 1/1987 | Vaughan | 204/182.4 |
| 4,891,067 | 1/1990 | Rappas et al. | 204/116 |

FOREIGN PATENT DOCUMENTS

| | | | |
|---|---|---|---|
| 0016859 | 2/1977 | Japan | 204/182.4 |
| 0070882 | 4/1983 | Japan | 204/182.4 |
| 191501 | 1/1967 | U.S.S.R. | |
| 810854 | 3/1981 | U.S.S.R. | 204/96 |
| 1054308 | 11/1983 | U.S.S.R. | 204/153 |

*Primary Examiner*—John Niebling
*Assistant Examiner*—John S. Starsiak, Jr
*Attorney, Agent, or Firm*—Shlesinger Arkwright & Garvey

[57] ABSTRACT

A solution, sol or colloidal dispersion of a substantially water insoluble metal hydroxide or acid and an alkali metal hydroxide are electrodialytically converted to a solid substantially water insoluble metal hydroxide or acid and a solution of the alkali metal hydroxide substantially free of the water insoluble metal hydroxide or acid. The conversion is effected by electrodialysis and electrotransport of an alkali metal cation from the solution, sol or dispersion through a cation permeable membrane into an aqueous alkali hydroxide solution and by using a water soluble anion of an acid to vary pH of the solution sol or dispersion to insolubilize the water insoluble metal hydroxide or acid. Sodium hydroxide etchants of aluminum are continously converted to solid aluminum hydroxide and aqueous sodium hydroxide free of aluminum hydroxide.

17 Claims, No Drawings

ELECTRODIALYTIC PROCESS FOR RESTORING SODIUM HYDROXIDE ETCHANTS FOR ALUMINUM

This application is a continuation of application Ser. No. 183,040, filed Apr. 19, 1988, now abandoned.

FIELD OF THE INVENTION

This invention relates broadly to an electrochemical process having an electrochemical cell compartmented with ion permeable membranes. More specifically, this invention relates to an electrochemical process for separating water insoluble metal hydroxides or acids of heavy metals from alkaline solutions. Specifically this invention relates to an electrochemical process for separating aluminum hydroxide from a sodium hydroxide solution used to chemically machine, etch, aluminum and aluminum alloys. This invention comprises the use of a soluble anion, soluble salt of an acid, in the compartment of an electrolytic cell to which is fed the alkaline solution comprising aluminum hydroxide. The soluble salt of an acid makes possible, in electrodialysis, control of the pH of the solution in the cell compartment to which the alkaline etchant or solution is fed and dilution of the etchant to cause insolubilization or precipitation of aluminium hydroxide or other water insoluble metal hydroxides and acids. The aluminum hydroxide and other hydroxides can be removed by filtration and other separation technologies.

One embodiment of the process of this invention relates to an electrochemical process comprising an electrochemical cell having an anolyte compartment and a catholyte compartment separated by a cation permeable membrane. The catholyte compartment contains a cathode and a catholyte comprising an aqueous solution of an alkali hydroxide. The anolyte compartment contains an anode and an anolyte comprising a soluble anion, salt of an acid, to which is fed a solution of an alkali hydroxide and a substantially water insoluble metal hydroxide or acid. Electric current is passed through the cell to effect electrodialysis whereby alkali metal cations are electrotransported from the anolyte through the membrane into the catholyte and converted to hydroxide and the metal acidic hydroxide is insolubilized in the anolyte compartment.

Another embodiment of the process of this invention relates to an electrochemical process comprising an electrochemical cell having at least three compartments that are separated by cation permeable membranes. The cell has an anolyte compartment containing an anode and an anolyte comprising a water soluble acid; a reactor compartment having an aqueous solution comprising a soluble acid or salt of an acid to which is added a solution of an alkali hydroxide and a substantially water insoluble metal hydroxide or acid and a catholyte compartment containing a cathode and an aqueous solution comprising an alkali hydroxide. An alkaline solution comprising aluminum hydroxide, sodium aluminate, or other metal acidic oxide is fed to the reactor compartment and electricity is passed through the cell whereby alkali metal cations are electrotransported from the reactor compartment to the catholyte compartment and the aluminum hydroxide or other heavy metal acidic oxide is insolubilized in the reactor compartment. The insolubilized aluminum hydroxide or other metal acidic hydroxide is removed from the reactor solution by filtration or other separation technologies.

BACKGROUND OF THE INVENTION

Aluminum and alloys of aluminum are chemically machined, etched, in solutions of alkali hydroxides, especially sodium hydroxide. The machining rate decreases with machining and it is necessary to periodically remove the aluminum from the sodium hydroxide or to discard the etchant solution. It would be preferable if the composition of the etchant could be maintained constant at an aluminum content optimum for machining and substantially all of the sodium hydroxide could be continuously used as the etchant. It is possible to remove aluminum hydroxide or sodium aluminate from the sodium hydroxide by cooling the solution, seeding and crystallizing with removal by filtration. This process is, however, difficult to carry out, limited in the percentage of aluminum that can be removed from the etchant and requires a relatively large investment in crystallization and filtration equipment. It is an object of the instant invention to provide a process for removing aluminum from the sodium hydroxide etchant that is easy to operate, permits continuous removal of aluminum and reuse of sodium hydroxide and essentially zero discharge of liquid from the etchant process.

Many of the hydroxides of heavy metals such as aluminum, lead, tin, zinc, gallium and tungsten are soluble or appear to be soluble in excess of sodium or potassium hydroxide. This has been commonly attributed to the formation of salts of the hydroxides behaving as amphoteric substances (acid or basic properties) and giving either OH or H ions according to the conditions of the experiment. In the presence of strong alkalis they are supposed to behave as acids. For example when aluminum hydroxide is dissolved in sodium hydroxide sodium aluminate is supposed to be formed. It is possible, however, that the solution of the hydroxide is not so much a matter of compound formation as of peptization (change into a colloid or gel) of the hydroxide to form a sol. Aluminum is usually or etched in a 30 wt% sodium hydroxide solution at about 80° C. until 30 or more grams of aluminum per liter has been etched. The aluminum appears to be dissolved and it would be expected that concentration of the aluminum in the etchant by removal of the sodium hydroxide would, at some concentration, result in the precipitation of the aluminum as aluminum hydroxide or sodium aluminate. I have found, however, that removal of the sodium hydroxide by electrodialysis does not result in insolubilization of the aluminum until essentially all of the sodium hydroxide has been removed. The electrical conductivity of the aluminum-sodium hydroxide solution is equal to that of a plain solution of the sodium hydroxide which indicates that the aluminum is completely hydrolyzed and not ionic. The aluminum does not diffuse through paper or plastic membranes. It appears that the aluminum is colloidal and the hydroxyl ions in the solution is substantially that of the alkali. Although some sodium aluminate may be formed in very concentrated sodium hydroxide solutions, the formation of sodium aluminate in the usual sodium hydroxide etchants is relatively unimportant compared with the formation of the colloidal solution. It is obviously a difficult task to cool, seed and crystallize sodium aluminate or aluminum hydroxide from the colloidal solutions. Electrodialysis is a well known art (see U.S. Pat. Nos. 4,325,792; 4,439,293 and 4,626,288, the disclosures of which are incorporated by reference). Electrodialysis is the transport of ions through ion permeable membranes as a result of an electrical driving force. The process is commonly carried out in an electrochemical cell having a catholyte compartment containing a cathode and a catholyte and an anolyte compartment containing an anode and an anolyte. the catholyte and anolyte compartments being separated by ion permeable membranes. The electrotransport of sodium and other alkali metal cations through cation permeable membranes is a known art. However, prior processes do not provide a satisfactory solution to the problem of precipitation or insolubilization of aluminum hydroxide and other metal acidic oxides in alkaline solutions so that the aluminum hydroxide and other oxides or hydroxides can be separated and removed from the alkaline solution and the alkali hydroxide recovered for use. The prior processes do not provide a means of changing, varying, in electrolysis the pH of the alkaline solution to selectively insolubilize and remove aluminum and other heavy metal acidic oxides from alkaline solutions.

SUMMARY OF THE INVENTION

This invention provides an electrodialytic process for the continuous conversion of an alkali hydroxide solution comprising aluminum hydroxide or metal acidic oxides and acids into the alkali hydroxide and the solid heavy metal hydroxides or acids of heavy metals by the use of a soluble salt of an acid which acid in a one normal solution would preferably have a pH no greater than three in the compartment of an electrolytic cell to which is added a solution of an alkali hydroxide comprising aluminum hydroxide or substantially water insoluble metal hydroxides or acids. The conversion comprises passing electricity through an electrochemical cell whereby alkali metal cations are electrotransported from an alkali hydroxide solution into the catholyte compartment and the pH of the solution in the cell compartment to which the alkali hydroxide solution is added is such that heavy metal hydroxides or acids precipitate or become insoluble. The use of a soluble salt of an acid in the cell compartment to which the alkali hydroxide solution of aluminum or other metal oxides or acids is added provides a means for dilution of the alkaline solution with the compartment electroylte and for electrolytically varying the pH of solution in the cell compartment from that of the alkali hydroxide solution to that of the acid of the soluble salt. Preferably the pH is maintained at a value such that the metal hydroxides are selectively precipitated or at a value for essentially complete precipitation of all heavy metal hydroxides.

Another aspect of the electrodialytic conversion of alkali hydroxide solutions of heavy metal acidic oxides using a soluble salt of an acid is that the salt of the acid can be used again and again for effecting changes in pH. This provides for essentially complete and continuous conversion of, for example, a sodium hydroxide etchant for aluminum to a sodium hydroxide and a solid aluminum hydroxide using only electricity. The aluminum hydroxide can be removed, filtered, from the solution containing the soluble salt of an acid and the solution, filtrate, returned to the cell compartment. The sodium hydroxide is reformed in the catholyte compartment of the cell and can be continuously returned to the etching process.

DETAILED DESCRIPTION OF THE INVENTION

Many of the metal oxides or hydroxides appear to be soluble in excess of sodium or potassium hydroxide. These apparent solutions could be colloidal dispersions or sols of the heavy metal hydroxides or in some cases the salts of the heavy metal acidic hydroxides and the alkali hydroxide. Heating, cooling, concentrating, diluting or seeding these apparent solutions is ineffective in separating the heavy metal hydroxide, oxide or acid from the alkali hydroxide. I have found that electrodialysis can be used to remove most of the alkali hydroxide from the solution comprising heavy metal hydroxides to facilitate removal of the heavy metal hydroxides by seeding, cooling, crystallizing and filtering. In general, the separation is accomplished by diluting the alkali hydroxide depleted solution and removal of the heavy metal hydroxide by filtration. This method for separation of the alkali hydroxide and heavy metal hydroxide is usually carried out in a batch or semi-continuous process wherein the concentrated alkali hydroxide solution is fed to the anode or reactor compartment of an electrolysis cell whereby alkali metal cations are electrotransported from the solution to deplete the solution of alkali hydroxide. The depleted solution is then processed to remove the heavy metal hydroxide. The alkali hydroxide formed in the cathode compartment of the cell can be continuously removed for use. This process for removing only sodium ions from the alkali hydroxide solution does not, however, provide an efficient continuous process wherein the concentrated alkali hydroxide-heavy metal oxide solution is fed continuously to the electrodialytic cell, the reformed alkali hydroxide is continuously returned for use and the electrodialytic process is operated continuously at essentially the same electrical conductivity and capacity.

It has now been found that the use of a soluble salt of an acid in the anolyte or reactor compartment of an electrodialytic cell to which the alkali hydroxide-metal hydroxide or acid solution is fed provides a method for continuously separating alkali hydroxide solutions of substantially water insoluble metal hydroxides or acids. The electrolytic cell can be operated continuously at a desired capacity. The soluble salt of an acid provides a means for changing and controlling the pH of the solution in the anolyte or reactor compartment of the electrolytic cell and, in turn, the precipitation and separation of the substantially water insoluble metal hydroxide or acid from the alkali hydroxide solution. The alkali hydroxide is continuously reformed in the catholyte compartment of the electrodialytic cell.

In electrodialysis, cations are attracted to the negatively charged cathode and anions are attracted to the positively charged anode. A sodium hydroxide etchant for chemically machining aluminum does not contain an anion of an acid that is soluble and ionic, therefore, the etchant solution fed to an electrodialytic cell does not become acidic on electrolysis. By adding a salt of an acid, the anion of the salt being soluble, the solution in the anolyte or reactor compartment of the electrodialytic process to which the etchant is added can become acidic with electrolysis. Reduction in the pH of the alkali hydroxide solution results in the precipitation of aluminum hydroxide.

Any soluble salt of an acid can be used in the electrodialytic process of this invention. Preferably, the salt anion is the anion of an acid which acid in a one normal solution would have a pH no greater than three. The preferred soluble salts of acids are alkali salts of acids of sulfur, halogen, nitrogen, phosphorus and carbon, which acids in a 0.1 normal solution would have a pH of less than three and more preferably of two or less. Mixtures of soluble salts of acids of different cations and anions can be used. Preferably the soluble salts are salts of ammonium and alkali metal cations. When the soluble salt is added to the anolyte compartment of the electrodialytic cell, it is preferable that the salt or mixture of salts be free of halides since halogens would be formed. Salts of halides can be added to the reactor compartment of a three compartment cell. The concentration of the salt can be varied as will be apparent to one skilled in the art, the concentration of the salt must be sufficient to effect the desired pH in the anolyte or the reactor compartment solution of the electrodialytic cell. It will also be apparent to one skilled in the art that the anion of the salt effects the change in pH and that the anion can be added as an acid, a soluble salt, or a salt, such as, sodium aluminum sulfate that forms a soluble ionically mobile anion when added to the solution or during electrolysis.

The electrodialytic cells of this invention can have two or more compartments. A two compartment cell has an anolyte and a catholyte compartment separated by a cation permeable membrane. The anolyte compartment has an anode and an aqueous anolyte comprising a soluble salt of an acid, to which is added an alkali hydroxide solution of aluminum hydroxide, or other heavy metal oxides or acids. The catholyte compartment has a cathode and an aqueous catholyte comprising an alkali hydroxide. A three compartment cell of this invention has an anolyte compartment, a reactor compartment and a catholyte compartment separated by cation permeable membranes. The anolyte compartment has an anode and an aqueous anolyte, preferably an acidic solution, the reactor compartment has an aqueous solution comprising a soluble salt of an acid to which is added an alkali hydroxide solution of a heavy metal acidic hydroxide or acid. The catholyte compartment has a cathode and an aqueous solution comprising an alkali hydroxide. Cells of this invention that have more than three compartments can be separated by all cation permeable membranes or combinations of cation, anion, bi-polar membranes and porous separators, provided that the membrane between the cell compartment comprising the soluble salt of an acid to which is added the alkali hydroxide solution of a heavy metal acidic hydroxide is separated from the catholyte compartment by a cation permeable membrane.

Any cation permeable membrane can be used to separate the compartments of the electrodialytic cells of this invention. These cation permeable membranes have fixed negative charges distributed in the polymer matrix and are permeable to positively charged ions. The membranes are preferably membranes of hydrocarbon and halocarbon polymers containing acids and acid derivatives. Particularly suitable acid polymers are perhalocarbon polymers containing pendant sulfonic acid, sulfonamide and carboxylic acid groups. The membranes may be a multi-layered structure of different polymers and contain fillers, reinforcements and chemical modifiers. The preferred membranes are substantially chemically stable to the process conditions and mechanically suitable for design and economical operation of the electrodialytic process. The preferred membranes have high electrical conductivity and high electro-transport of alkali metal cations. The most preferred membranes are perfluorocarbon membranes, such as, NAFION, manufactured by duPont, that contain sulfonic, carboxylic or sulfonamide groups. Preferably the membrane separating the catholyte compartment from other cell compartments has a high electrotransport of alkali metal cations and is suitable for making various concentrations of alkali hydroxide solutions. A membrane with high water transport is preferable for dilute alkali hydroxide solutions and a membrane with low water transport is preferable when making concentrated alkali hydroxide solutions. Preferably the membrane separating the anolyte compartment from the reactor compartment has a high electrotransport of hydrogen ions and low transport of water to minimize dilution of the solution in the reactor compartment.

The alkali hydroxide of this invention can be a hydroxide of the alkali metals or ammonium. Preferably the alkali hydroxide is sodium hydroxide or potassium hydroxide. The alkali hydroxide can contain carbonates, bicarbonates and other chemicals normally used in etching and processing metals, especially aluminum. Mixtures of alkali hydroxides can be used. The alkali hydroxide aluminum hydroxide solution formed in the chemical machining of aluminum can have oxides and hydroxides of other metals including those in the aluminum alloys being machined. The solution can also have sulfides, amines and other chemicals used in the etching process. It is preferable when sulfides are present that the electrodialytic process be run at a pH low enough to convert the sulfides to a gas that is reacted with caustic and returned to the etching process. When metal oxides or hydroxides that are soluble in an acidic solution are present it is preferable that the electrodialytic process be carried out at a pH high enough to prevent solubilization of the metals. In general the pH should be greater than (3) three.

This invention is for the electrodialytic conversion of alkali hydroxide solutions of substantially water insoluble hydroxides, oxides or acids of heavy metals. Alkali hydroxide solutions, sols or colloidal dispersions of water insoluble hydroxides or acids of metal are found throughout the aircraft, missile, chemical, electronics, mining, metal finishing and other industries. These solutions comprise a variety of metal hydroxides and acids that are substantially insoluble in water but form solutions, sols or colloidal dispersion in solutions containing excess sodium or potassium hydroxide. Chemical machining of aluminum with sodium hydroxide results in the formation of a solution or apparent solution of aluminum hydroxide or sodium aluminate in the sodium hydroxide etchant. The etchant is now discarded when the dissolved aluminum reaches 30 to 60 grams per liter. The discarded etchant represents an inefficient use of sodium hydroxide and a very large volume waste to the environment. It is desirable that these etchant solutions be restored so that the sodium hydroxide could be used again and again to etch aluminum and the aluminum hydroxide or sodium aluminate be recovered for use. Preferably the restoration process would be continuous so that the composition of the etchant could be varied and controlled at conditions optimum for etching. It is desirable that the restoration process be energy efficient, easy to operate and have no discharge of toxic gas or solutions with toxic or hazardous chemicals.

One embodiment of the process of this invention is the restoration of alkali hydroxide etchants, especially sodium hydroxide etchants, for etching aluminum and aluminum alloys, in a two compartment electrodialytic cell. To illustrate the practice of this aspect of the instant invention an electrodialytic cell was assembled having an anolyte compartment containing an anode and a catholyte compartment containing a cathode. The compartments were separated by a cation permeable membrane. The cell had an electrolysis area of one (1) square inch and the volume of solution in the anolyte and catholyte compartment was 25 ml. The anode was a titanium mesh with an iridium oxide coating obtained from the Electrode Corporation. The cation permeable membrane was NAFION 417 that was obtained from the duPont Company. The cathode was a copper mesh electro-coated with nickel. The total anode to cathode gap was 0.3 inches, the cell temperature 80°-85° C., the current density 2 amperes per square inch. Cell voltage was the total anode to cathode voltage. The power supply was made by Hewlett Packard and equipped to run at constant current and variable voltage. The used etchant solution was prepared by dissolving (etching) 38 grams of aluminum in one liter of solution containing 30 wt% sodium hydroxide. The catholyte solution was prepared by dissolving 10 grams of sodium hydroxide in 100 ml of water. The transport of sodium cations from the anolyte was determined by titration of the catholyte adjusted for the change in volume of the catholyte resulting from the electro-pumping of water from the anolyte solution. Each experimental example comprises a series of experiments wherein the used etchant solution was the same. A change in cell voltage during an experiment indicates a change in conductivity of the anolyte. The conductivity of the catholyte was essentially the same for all experiments.

EXAMPLE 1

In the two compartment cell, 25 ml of catholyte was added to the catholyte compartment and 25 ml of the used etchant was added to the anolyte compartment. The initial cell voltage was 3.8 and remained constant until about 80% of the sodium cations had been electro-transported into the catholyte solution. There was no visible solids in the anolyte. The cell voltage increased from 3.8 to 4.5 as the sodium cations were electro-transported into the catholyte until about 95% of the sodium ions had been transported and at this point the cell voltage increased rapidly up to 20 volts and the experiment was terminated. The anode contained a light coating of a white material but was still active and the anolyte solution was essentially free of solids. An aliquot of the anolyte was removed, titrated and found to contain 1.2 g/liter of hydroxide. On cooling diluting and filtering the anolyte about 1.9 grams of aluminum hydroxide was removed from the anolyte. The cell was cleaned and 25 ml of catholyte was added to the cathode compartment and a 25 ml aliquot of the used etchant containing 5 grams of sodium sulfate was added to the anolyte compartment. The initial cell voltage was 3.8 and remained essentially constant until about 90% of the sodium ions had been transported to the catholyte and the voltage increased slowly to 4.1 at which time white solids began to form in the anolyte. The pH of the anolyte was 13.5. The voltage remained at about 4.1 until the pH of the anolyte reached 3.2 and the experiment was terminated. The anolyte was filtered and about 2 grams of aluminum hydroxide was obtained. Essentially all of the sodium ions were recovered in the catholyte. The catholyte at first increased in concentration of sodium hydroxide and then decreased in concentration when the anolyte became acidic. The electro-transport of water increased with decrease in the sodium ion transport.

These experiments show that electro-acidification of the etchant by the addition of sulfate is an effecient means for separating aluminum hydroxide from a sodium hydroxide solution used to etch aluminum.

One embodiment of the process of this invention is the electrodialytic restoration of sodium hydroxide solution used to etch aluminum wherein the electrochemical chemical cell has three or more compartments. To illustrate the practice of this aspect of the instant invention an electrodialytic cell was assembled having an anolyte compartment containing an anode, a reactor compartment, and a catholyte compartment containing a cathode. The compartments were separated by cation permeable membranes. The cell had an electrolysis area of nine (9) square inches and was equipped for continuously adding water to maintain the volume of the anolyte. The reactor compartment was equipped to continuously add a sodium hydroxide etchant containing dissolved aluminum and to filter aluminum hydroxide from the reactor solution and return the solution to the reactor compartment. The catholyte compartment was equipped to remove catholyte and maintain the level of catholyte in the catholyte compartment. The anode was made of rods of Ebonex, a reduced oxide of titanium in ceramic form obtained from Ebonex Technologies. The cathode was a copper mesh coated with nickel. The cation permeable membranes were NAFION membrane 417 separating the anolyte and reactor compartments and NAFION 324 membrane separating the catholyte and reactor compartments. The membranes were obtained from the duPont Company. The total anode to cathode gap was 0.4 inches, the cell temperature was 80°-85° C., the current density 2 amperes per square inch. Cell voltage was the total anode to cathode voltage. The power supply was custom made and equipped to run at constant current and variable voltage. The volume of the anolyte compartment and anolyte was 500 ml, the reactor compartment 3000 ml, and the catholyte compartment 100 ml at overflow to storage.

EXAMPLE 2

The anolyte compartment was filled with a 5 wt% sulfuric acid solution, the reactor with a 15 wt% sodium sulfate solution and the catholyte compartment with a 10 wt% sodium hydroxide solution. The initial cell voltage was 4.2. The etchant solution containing 38 grams per liter of dissolved aluminum was added to the reactor compartment at a rate to maintain the pH of the solution at 13. The cell voltage was 4.1 and constant throughout the one hour operation. Aluminum hydroxide was continuously precipitated (filtered) and removed from the reactor solution, dried and weighed. About 99% of the aluminum dissolved in the etchant was recovered. Essentially 100% of the sodium cations in the etchant was recovered as sodium hydroxide. After one hour, the addition rate of etchant feed to the reactor compartment was adjusted (slightly reduced) to effect reducing the pH of the reactor solution to a pH of 10. The cell voltage was 4.1 and essentially constant. After 30 minutes the feed rate of etchant was adjusted (small reduction) to effect reducing the pH of the reactor solution to a pH of 5. The cell voltage was 4.0 and essentially constant. After 30 minutes the experiment was terminated. The recovery of aluminum that was dissolved in the sodium hydroxide solution as aluminum hydroxide was about 99% at a pH of 10 and a pH of 5. Essentially 100% of the sodium hydroxide was recovered as catholyte. The reactor solution was replaced with a 20 wt% solution of sodium chloride and the etchant feed to the reactor compartment was adjusted to obtain a pH of 14. The cell voltage was 3.8 and essentially constant. Aluminum hydroxide was continuously formed in the reactor solution and removed by filtration. After one hour, the etchant feed rate was decreased slightly to effect a pH of 7 in the reactor solution. The voltage was 3.8, essentially unchanged. The recovery of dissolved aluminum was about 99% at a pH of 10 and 7 and the sodium hydroxide recovery was essentially 100%.

EXAMPLE 3

The three compartment cell of Example 2 was changed to a two compartment cell by removing the reactor compartment and separating the compartments with a NAFION 417 membrane. The volume of the anolyte solution was increased to one (1) liter by an external tank and equipped to flow the anolyte solution through the anolyte compartment. The electrode-gap was about 0.1 inch. The anolyte solution was changed to a 10 wt% sodium sulfate solution. The etchant and catholyte were the same as in Example 2. The initial cell voltage was 3.8. The etchant was added at a rate to effect precipitation of aluminum hydroxide and at a pH ranging from 12 to 14. The electrolysis operated smoothly with essentially complete recovery of the sodium hydroxide and dissolved aluminum. There was no apparent fouling of the anode. The transport of water from the anolyte to the catholyte was higher in the two compartment cell as compared with the three compartment cell.

The etchant feed was changed to a 28 wt% sodium hydroxide solution containing 50 grams of an aluminum alloy of about 6 wt% copper and 1 wt% manganese and about a 6.5 volume % of a Dapco solution containing triethanol amine and alkali sulfides. Other conditions were the same except the anolyte compartment was vented to a sodium hydroxide scrubber to remove sulfides. The etchant feed contained an insoluble material, mostly copper hydroxide. The initial cell voltage was 4.2 and remained essentially constant. The etchant feed rate was adjusted to obtain a pH of 13.5 in the anolyte. Aluminum hydroxide precipitated continuously and was removed by filtration. The initial filtration of the anolyte removed essentially all of the insoluble material from the used etchant. After 30 minutes of operation the etchant feed to the anolyte compartment was reduced slightly to lower the pH of the anolyte to 3.5. The cell voltage was 4.1 and essentially constant. Aluminum hydroxide precipitated continuously as the etchant was added to the anolyte. Essentially all of the dissolved aluminum was recovered as aluminum hydroxide and all of the sodium ions as sodium hydroxide. The sodium hydroxide contained triethanol amine and was free of copper and sulfides. Most of the sulfide released in the acidic anolyte was recovered in the caustic scrubber. The copper hydroxide-sulfide residue of the first filtration of the anolyte solution was acidified with sulfuric acid to effect dissolution of the copper and the resulting solution electrodialytically processed (see U.S. Pat. No. 4,626,288) to obtain copper hydroxide.

These experiments show that aluminum hydroxide can be separated from a sodium hydroxide solution used to etch aluminum by adding the etchant to the anolyte compartment of an electrolytic cell wherein the anolyte solution contains a solution of sodium sulfate. The precipitaion appears to result from the breaking of a sol or colloidal suspension of the aluminum hydroxide in the akali hydroxide solution. In the electrodialytic process the etchant is highly diluted by the anolyte solution and the pH of the anolyte can be adjusted to effect precipitation. The use of a soluble salt of an acid in the anolyte of a two compartment cell and in a reactor compartment of a three or more compartmented provides an efficient continuous electrodialytic process for conversion of alkali hydroxide solutions of aluminum and other heavy metal hydroxides and acids to the solid aluminum hydroxide and a solution of the alkali hydroxide substantially free of aluminum and other heavy metal hydroxides.

I claim:

1. The process for continuously separating a sol, colloidal dispersion or solution of a substantially water insoluble metal hydroxide, including those that may have acid properties, from an alkali metal hydroxide by use of an electrodialytic cell having anolyte, and catholyte compartments separated by cation permeable membranes, and having an anode and a cathode respectively, comprising the steps of:
   a) maintaining an aqueous solution in the anolyte compartment at a pH of less than 14 by adding to the solution a soluble salt of an acid having an anion soluble therein which facilitates the electrodialytic reduction and control of the solution pH to precipitate a hydroxide of a multivalent metal;
   b) initially placing a weak alkaline hydroxide solution in the catholyte compartment;
   c) continuously introducing the said sol, colloidal dispersion or solution to the anode compartment;
   d) supplying a continuous electrical amperage to the anode and cathode to induce a continuous electrotransport of only alkali metal cations across the cation permeable membrane to the cathode compartment;
   e) continuously removing a metal hydroxide of the oxidized metal from the anolyte solution; and,
   f) continuously removing a pure alkali metal hydroxide formed by the electrotransported metal cations and the hydroxide ions of the catholyte compartment.

2. The process for separating a mixture of a substantially water insoluble metal hydroxide, including those that may have acid properties, from an alkaline metal hydroxide as set forth in claim 1, wherein:
   a) an ion of a water soluble acid containing an anion is added to the aqueous anolyte solution to maintain it within the pH range of less than 14.

3. The process for separating a mixture of a substantially water insoluble metal hydroxide, including those that may have acid properties, from an alkaline metal hydroxide as set forth in claim 1, including the step of:
   a) supplying a hydroxide of aluminum to the anolyte compartment as part of the alkali hydroxide-metal oxide mixture.

4. The process for separating a mixture of a substantially water insoluble metal hydroxide from an alkaline metal hydroxide as set forth in claim 1 including the step of:
   a) continuously introducing to the anode compartment as the mixture, a sol of the alkali hydroxide metal oxide mixture.

5. The process for separating a mixture of a substantially water insoluble metal hydroxide from an alkaline metal hydroxide as set forth in claim 1 including the step of:
   a) continuously introducing to the anode compartment as the mixture, a colloidal dispersion of the alkali hydroxide metal oxide mixture.

6. The process for separating a mixture of a substantially water insoluble metal hydroxide, including those that may have acid properties, from an alkaline metal hydroxide as set forth in claim 1, including the step of:
   a) continuously introducing to the anode compartment as the mixture, a solution of the alkali hydroxide metal oxide mixture.

7. The process for separating a mixture of a substantially water insoluble metal hydroxide, including those that may have acid properties, from an alkaline metal hydroxide as set forth in claim 1, including the step of:
   a) continuously introducing to the anode compartment as the mixture, an acid of the substantially water insoluble hydroxide to maintain the pH of the aqueous solution at a pH of less than 14.

8. The process for separating a mixture of a substantially water insoluble metal hydroxide, including those that may have acid properties, from an alkaline metal hydroxide as set forth in claim 7, including the step of:
   a) supplying a hydroxide of aluminum to the anolyte compartment as part of the alkali hydroxide-metal oxide mixture.

9. A process using an electrodialytic cell for the electrodialytic separation of a sol, colloidal dispersion or solution of a substantially water insoluble multi-valent metal hydroxide or acid and an alkali metal hydroxide into a solid of said substantially water insoluble multivalent metal hydroxide or acid and an aqueous solution of said alkali metal hydroxide substantially free of said water insoluble metal hydroxide or acid which comprises passing electric current through an electrolysis cell having at least an anolyte compartment containing an anode and a first aqueous solution as an anolyte solution, which solution has a soluble salt of an acid having an anion soluble therein which facilitates the electrodialytic reduction and control of the solution pH to precipitate a hydroxide of the multivalent metal hydroxide, and a reactor compartment separated by a cation permeable membrane from the active compartment and containing a second aqueous solution, the reaction compartment also separated by a cation permeable membrane from a catholyte compartment, adding to the reactor compartment said sol, colloidal dispersion or solution, and the catholyte compartment containing a cathode and a catholyte solution which is an aqueous solution of said alkali metal hydroxide substantially free of said substantially water insoluble metal hydroxide or acid which is continuously removed.

10. The process of claim 9 wherein said first solution in said anolyte compartment contains a water soluble acid said acid preferably selected from acids of sulfur, nitrogen, halogen, phosphorus and carbon the acids of which in a 0.1N solution have a pH no more than two.

11. The process of claim 9 wherein said second aqueous solution in said reactor compartment comprises (1) said sol, colloidal dispersion or solution of said substantially water insoluble metal hydroxide or acid and an alkali metal hydroxide and (2) a water soluble anion of an acid said anion preferably selected from acids of sulfur, nitrogen, halogen, phosphorus, and carbon the acids of which in a 0.1N solution have a pH no more than two.

12. The process of claim 9 wherein said first aqueous solution comprises said sol, colloidal dispersion or solution of said substantially water insoluble metal hydroxide or acid and an alkali metal hydroxide.

13. The process of claim 9 wherein said first aqueous solution comprises (1) said sol, colloidal dispersion or solution of said substantially water insoluble metal hydroxide or acid and an alkali metal hydroxide and (2) a soluble anion of an acid preferably said acid selected from acids of sulfur, nitrogen, halogen, phosphorus and carbon the acids of which in a 0.1N solution having a pH of no more than 2.

14. The process of claim 9 wherein said second aqueous solution contains (a) a soluble salt of an acid which acid in a one normal solution has a pH no greater than three preferably said acid in a 0.1N solution has a pH no greater than 2 and selected from acids of sulfur, halogen, nitrogen, phosphorus and carbon and (b) an immobilizing agent capable of reacting with multivalent metal cations to form ionically immobile compounds selected from precipitates, complexes and chelates of multivalent metal cations.

15. The process of claim 9 wherein said substantially water insoluble metal hydroxide or acid is a hydroxide or acid of aluminum.

16. The process of claim 9 wherein said first aqueous solution has a pH less than 14.

17. The process of claim 9 wherein said second aqueous solution comprising said sol, colloidal dispersion or solution of said substantially water insoluble metal hydroxide or acid and an alkali metal hydroxide has a pH less than 14.

* * * * *